US010013451B2

(12) United States Patent
Garcia-Arellano et al.

(10) Patent No.: US 10,013,451 B2
(45) Date of Patent: Jul. 3, 2018

(54) OPTIMIZING STANDBY DATABASE MEMORY FOR POST FAILOVER OPERATION

(71) Applicant: International Business Machines Corporation, Armonk, NY (US)

(72) Inventors: Christian M. Garcia-Arellano, Richmond Hill (CA); Hamdi Roumani, Toronto (CA); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/071,586

(22) Filed: Mar. 16, 2016

(65) Prior Publication Data

US 2017/0270016 A1 Sep. 21, 2017

(51) Int. Cl.
*G06F 11/00* (2006.01)
*G06F 17/30* (2006.01)
(Continued)

(52) U.S. Cl.
CPC .......... *G06F 17/30371* (2013.01); *G06F 9/50* (2013.01); *G06F 11/008* (2013.01); *G06F 11/0709* (2013.01); *G06F 11/0727* (2013.01); *G06F 11/2028* (2013.01); *G06F 11/2038* (2013.01); *G06F 11/2048* (2013.01);
(Continued)

(58) Field of Classification Search
CPC .............. G06F 11/3409; G06F 11/008; G06F 11/0709; G06F 11/0727; G06F 11/2041; G06F 11/3442
See application file for complete search history.

(56) References Cited

U.S. PATENT DOCUMENTS 7,694,102 B2    4/2010    Garcia-Arellano et al.
8,352,608 B1 *    1/2013    Keagy ...................... G06F 8/63
                                                                                                     709/220

(Continued)

OTHER PUBLICATIONS

Garcia-Arellano et al., "Optimizing Standby Database Memory for Post Failover Operation", U.S. Appl. No. 15/618,277, filed Jun. 9, 2017, 26 pages.

(Continued)

*Primary Examiner* — Charles Ehne
(74) *Attorney, Agent, or Firm* — Brian M. Restauro

(57) ABSTRACT

A current minimum memory requirement for each memory consumer of one or more memory consumers of a primary database system is received. A current memory allocation for a standby database system is received. A set of benefit-to-cost metrics is received. A benefit-to-cost metric is a measure of whether each memory consumer would benefit or would not benefit from additional memory. The set of benefit-to-cost metrics is applied to the standby database system to define an upper bound memory allocation of the standby database system to function in the event of a failover from the primary database system. A scaling factor is determined. In response to receiving an indication of a failover of the primary database system to the standby database system, a ramp up of the standby database system is monitored. The ramp up of the standby database system uses the set of benefit-to-cost metrics and the determined scaling factor.

13 Claims, 4 Drawing Sheets

(51) Int. Cl.
  *G06F 11/07*    (2006.01)
  *G06F 11/34*    (2006.01)
  *G06F 9/50*     (2006.01)
  *G06F 11/20*    (2006.01)

(52) U.S. Cl.
  CPC .... *G06F 11/3409* (2013.01); *G06F 17/30377* (2013.01); *G06F 2201/80* (2013.01)

(56) References Cited

U.S. PATENT DOCUMENTS

| | | | |
|---|---|---|---|
| 9,009,116 B2 | 4/2015 | Cattell et al. | |
| 2010/0250748 A1* | 9/2010 | Sivasubramanian | G06F 9/5016 709/226 |
| 2010/0251002 A1* | 9/2010 | Sivasubramanian | G06F 9/5061 714/2 |
| 2011/0178984 A1 | 7/2011 | Talius et al. | |
| 2011/0288847 A1* | 11/2011 | Narayanan | G06F 11/3419 703/19 |
| 2013/0151895 A1 | 6/2013 | Lee | |
| 2014/0115251 A1 | 4/2014 | Belluomini et al. | |
| 2015/0161012 A1 | 6/2015 | Meier et al. | |

OTHER PUBLICATIONS

IBM List of IBM Patent Applications Treated As Related, Appendix P, Dated Jun. 9, 2017 2 pages.

"Managing a Logical Standby Database", Oracle Database Online Documentation, 11g Release 2 (11.2), Data Guard Concepts and Administration, Copyright © 2015, Oracle and/or its affiliates, Chapter 10, Printed Jan. 5, 2016 11:56 AM, 25 pages, <http://docs.oracle.com/cd/E11882_01/server.112/e41134/manage_ls.htm#SBYDB00800>.

"Oracle Database High Availability Solutions", Oracle Database Online Documentation, 10g Release 2 (10.2), Database High Availability Overview, Copyright © 2015, Oracle and/or its affiliates, Chapter 2, Printed Jan. 5, 2016 1:06 PM, 24 pages, <http://docs.oracle.com/cd/B19306_01/server.102/b14210/hafeatures.htm#CJACEEIA>.

* cited by examiner

|  | MEMORY CONSUMER 'A' | MEMORY CONSUMER 'B' | MEMORY CONSUMER 'C' |
|---|---|---|---|
| MEMORY ALLOCATION | 50% | 40% | 10% |
| I/O OPERATIONS | 1000 | 800 | 200 |
| Δ = + 1 | 50 (950) | 80 (720) | 100 (100) |
| Δ = - 1 | 10 (1050) | 80 (880) | 100 (300) |

FIG. 3

OPTIMIZING STANDBY DATABASE MEMORY FOR POST FAILOVER OPERATION

BACKGROUND OF THE INVENTION

The present invention relates generally to the field of data storage, and more particularly to optimizing standby database memory for post failover operation.

Storing and maintaining data is important on a small scale (e.g., a homeowner keeping tax records), medium scale (e.g., companies of all sizes), and large scale (e.g., the United States government). A key component in data maintenance is data backup. Some databases utilize a HADR (High Availability Disaster Recovery) system as a means of maintaining data. In a HADR environment, log data is shipped continuously from a primary database to a standby database and reapplied to the standby database so that the two databases are kept synchronized. In the event the primary database fails, the workload of the primary database is taken over by the standby database. This process is known as failover.

SUMMARY

Embodiments of the present invention include a method, computer program product, and system for optimizing standby database memory for post failover operation. In one embodiment, a current minimum memory requirement for each memory consumer of one or more memory consumers of a primary database system is received. A current memory allocation for a standby database system is received. A set of benefit-to-cost metrics is received. The set of benefit-to-cost metrics include a benefit to cost metric for each memory consumer of the one or more memory consumers of the primary database system. A benefit-to-cost metric is a measure of whether each memory consumer would benefit or would not benefit from additional memory. The set of benefit-to-cost metrics is applied to the standby database system to define an upper bound memory allocation of the standby database system to function in the event of a failover from the primary database system. A scaling factor is determined using one or more of the following: a number of memory consumers on the standby database system, a total amount of memory on the standby database system, and a user input which specifies an amount of time allowed for the standby database system to ramp up, from a memory utilization perspective, during failover of the primary database system. In response to receiving an indication of a failover of the primary database system to the standby database system, a ramp up of the standby database system is monitored. The ramp up of the standby database system uses the set of benefit-to-cost metrics and the determined scaling factor.

BRIEF DESCRIPTION OF THE DRAWINGS

FIG. 3 is an exemplary example of the "benefit-to-cost" metrics of increasing or decreasing available memory of a memory consumer in a database system by one block of memory, in accordance with an embodiment of the present invention.

DETAILED DESCRIPTION

Some embodiments of the present invention recognize that a primary database may operate in a High Availability Disaster Recovery (HADR) environment in which a standby database is available to take over the primary database workload in the event the primary database fails. This "take over" process is known as failover. The primary database may utilize a Self-Tuning Memory Manager (STMM) to allocate and balance available memory amongst the primary database memory consumers. However, if failover occurs, the standby database memory is not "tuned" in the same manner as the primary database which may negatively impact the performance of the standby database.

Embodiments of the present invention recognize that there may be a method, computer program product, and computer system for optimizing standby database memory for post failover operation. The method, computer program product and computer system may use STMM input from the primary database along with "benefit-to-cost" metrics of the primary database and a scaling factor to optimize the memory in the standby database so that in the event of a failover, performance of the standby database is optimal.

Figure 1:
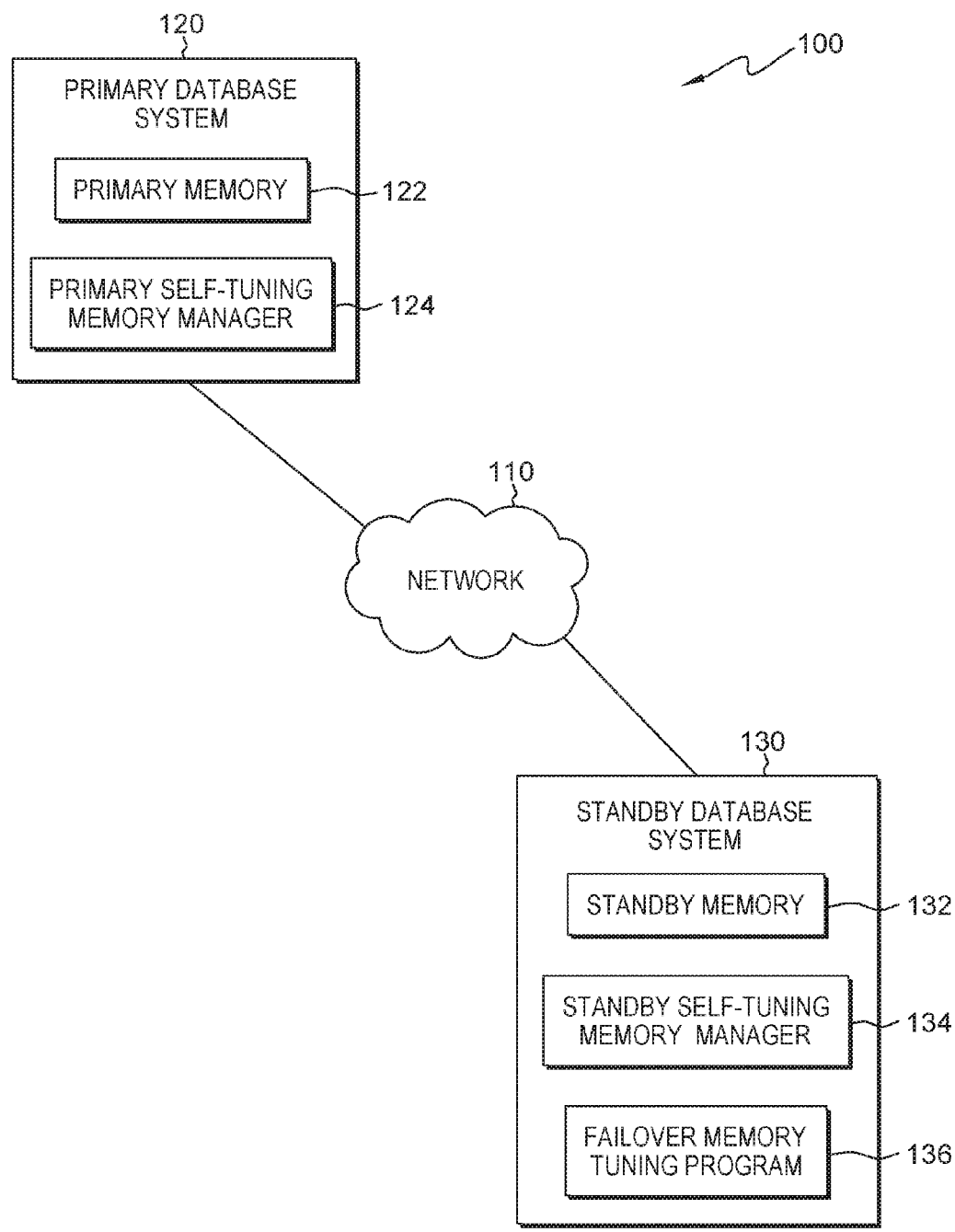
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes primary database system 120 and standby database system 130. Primary database system 120 includes primary memory 122 and primary self-tuning memory manager 124. Standby database system 130 includes standby memory 132, standby self-tuning memory manager 134 and failover memory tuning program 136. Primary database system 120 and standby database system 130 are interconnected via network 110. In example embodiments, computing environment 100 may include other computing devices not shown such as smartwatches, cell phones, smartphones, phablets, tablet computers, laptop computers, desktop computers, other computer servers or any other computer system known in the art, interconnected with primary database system 120 and standby database system 130 over network 110.

In example embodiments, primary database system 120 and standby database system 130 may connect to network 110 which enables primary database system 120 and standby database system 130 to access any other computing devices and/or data not directly stored on primary database system 120 or standby database system 130. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between primary database system 120, standby database system 130, and other computing devices (not shown) within computing environment 100, in accordance with embodiments of the present invention.

In embodiments of the present invention, primary database system 120 may be a laptop, tablet, or netbook personal computer (PC), a desktop computer, a personal digital assistant (PDA), a smartphone, or any other hand-held, programmable electronic device capable of communicating with any computing device within computing environment 100. In certain embodiments, primary database system 120 represents a computer system utilizing clustered computers and components (e.g., database server computers, application server computers, etc.) that act as a single pool of seamless resources when accessed by elements of computing environment 100. In general, primary database system 120 is representative of any electronic device or combination of electronic devices capable of executing computer readable program instructions. Computing environment 100 may include any number of primary database system 120. Primary database system 120 may include components as depicted and described in further detail with respect to FIG. 4, in accordance with embodiments of the present invention. Standby database system 130 is substantially similar to primary database system 120. In an embodiment, a single standby database system 130 is available for a single primary database system 120. In another embodiment, a single standby database system 130 is available for more than one primary database system 120. In yet another embodiment, more than one standby database system 130 is available for a single primary database system 120.

In an embodiment, primary memory 122 may be storage that may be written to and/or read by primary database system 120. In one embodiment, primary memory 122 resides on primary database system 120. In other embodiments, primary memory 122 may reside on standby database system 130 or any other device (not shown) in computing environment 100, in cloud storage or on another computing device accessible via network 110. In yet another embodiment, primary memory 122 may represent multiple storage devices within primary database system 120. Primary memory 122 may be implemented using any volatile or non-volatile storage media for storing information, as known in the art. For example, primary memory 122 may be implemented with a tape library, optical library, one or more independent hard disk drives, multiple hard disk drives in a redundant array of independent disks (RAID), solid-state drives (SSD), or random-access memory (RAM). Similarly, primary memory 122 may be implemented with any suitable storage architecture known in the art, such as a relational database, an object-oriented database, or one or more tables. In an embodiment of the present invention, the applications (not shown) operating on primary database system 120 may store data to primary memory 122. Examples of data stored to primary memory 122 include financial data from banks, product inventory data for a supplier, social media data, etc. Standby memory 132 is substantially similar to primary memory 122.

In an embodiment, primary self-tuning memory manager 124 is a program which distributes memory resources among the various consumers of memory on primary database system 120. Primary self-tuning memory manager 124 also allocates and deallocates memory for the memory consumers based on current system constraints such as the current workload (i.e., the number of applications running) on primary database system 120. Primary self-tuning memory manager 124 functions by iteratively modifying the configuration of primary memory 122 in small increments with the goal of improving the overall performance of primary database system 120. Standby self-tuning memory manager 134 is substantially similar to primary self-tuning memory manager 124.

According to embodiments of the present invention, standby database system 130 includes user standby memory 132, standby self-tuning memory manager 134 and failover memory tuning program 136.

In embodiments of the present invention, failover memory tuning program 136 may be a program, subprogram of a larger program, application, plurality of applications, or mobile application software which functions to optimize standby database memory for post failover operation. In an embodiment, failover is the process of the standby database system taking over the workload of a failing primary database system. A program is a sequence of instructions written by a programmer to perform a specific task. Failover memory tuning program 136 may run by itself but may be dependent on system software (not shown) to execute. In one embodiment, failover memory tuning program 136 functions as a stand-alone program residing on standby database system 130. In another embodiment, failover memory tuning program 136 may be included as a part of an operating system (not shown) of standby database system 130. In yet another embodiment failover memory tuning program 136 may work in conjunction with other programs, applications, etc., found on standby database system 130 or in computing environment 100. In yet another embodiment, failover memory tuning program 136 may be found on primary database system 120 or other computing devices (not shown) in computing environment 100 which are interconnected to standby database system 130 via network 110.

According to embodiments of the present invention, failover memory tuning program 136 functions to optimize standby database memory for post failover operation. According to an embodiment of the present invention, failover memory tuning program 136 utilizes "benefit-to-cost" metrics of primary database system 120 as an input to optimize standby memory 132 in standby database system 130 in preparation for a possible failover event.

Figure 2:
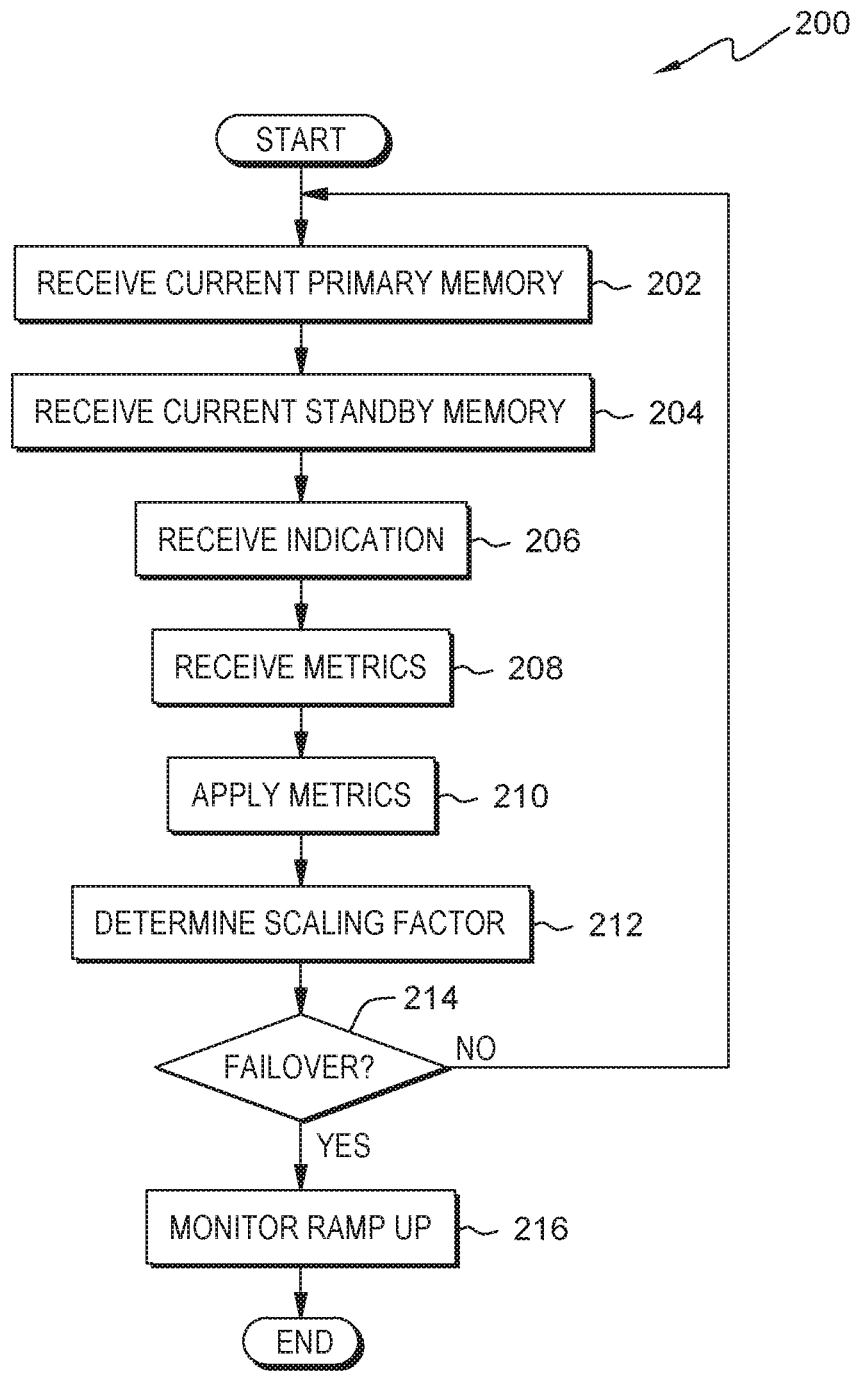
FIG. 2 is a flowchart depicting operational steps of a program that functions to optimize standby database memory for post failover operation, in accordance with an embodiment of the present invention.

FIG. 2 is a flowchart of workflow 200 representing operational steps for optimizing standby database memory for post failover operation, in accordance with an embodiment of the present invention. In one embodiment, failover memory tuning program 136 performs the operational steps of workflow 200. In an alternative embodiment, any other program, while working with failover memory tuning program 136, may perform the operational steps of workflow 200. In an embodiment, failover memory tuning program 136 may invoke the operational steps of workflow 200 upon the request of a user. In an alternative embodiment, failover memory tuning program 136 may invoke the operational steps of workflow 200 automatically upon the passage of a time interval (i.e., one second, fifteen seconds, thirty seconds, etc.). In an embodiment, any of the operational steps of workflow 200 may be performed in any order.

FIG. 3 is an exemplary example of the "benefit-to-cost" metrics of increasing or decreasing available memory of a memory consumer in a database system by one block of memory, in accordance with an embodiment of the present invention. The "benefit-to-cost" metrics are a measure for determining which memory consumers need additional memory the least and which memory consumers would benefit the most from additional memory. The "benefit-to-cost" metrics are determined by calculating the "benefit" (e.g., the number of input/output operations avoided and the time saved) by adding an additional block of memory to the memory allocation for a given memory consumer. The "cost" of removing a block of memory is also determined. In FIG. 3, column 302, column 304 and column 306 comprise memory consumer 'A', memory consumer 'B', and memory consumer 'C', respectively. Row 308 in FIG. 3 includes the current memory allocation for each memory consumer while row 310 includes the number of input/output (I/O) operations each memory consumer is able to execute at the given memory allocation. Row 312 in FIG. 3 shows the number of I/O operations saved, and the new number of I/O operations in parentheses, for each memory consumer with the addition of one memory block to the current memory allocation. Row 314 in FIG. 3 shows the additional number of I/O operations needed, and the new number of I/O operations in parentheses, for each memory consumer with the removal of one memory block from the current memory allocation.

In an embodiment, failover memory tuning program 136 receives current primary memory (step 202). In other words, failover memory tuning program 136 receives the current minimum memory requirements made by primary self-tuning memory manager 124. A memory consumer may be a program, an application, a database, or any other user of memory. In an embodiment, failover memory tuning program 136 receives from primary self-tuning memory manager 124 the minimum primary memory 122 requirements needed for primary database system 120 to function. For example, as shown in FIG. 3, memory is allocated to three memory consumers on a primary database as follows: memory consumer 'A'—fifty percent, memory consumer 'B'—forty percent, and memory consumer 'C'—ten percent.

In an embodiment, failover memory tuning program 136 receives current standby memory allocation (step 204). In other words, failover memory tuning program 136 receives current the memory allocation made by standby self-tuning memory manager 134 so that standby memory 132 may be allocated amongst the memory consumers (if present) on standby database system 130. In an embodiment, there may be no active memory consumers on a standby database system 130. In another embodiment, standby database system 130 may have one or more active memory consumers. This determination does not prepare standby database system 130 for failover as the memory resources of primary database system 120 may differ from those of standby database system 130. According to an embodiment of the present invention, the memory allocation of standby database system 130, as determined by self-tuning memory manager 134, defines the lower bound (i.e., worst case) memory allocation required for primary database system 120 to function on standby database system 130 in the event of failover. In an embodiment, failover memory tuning program 136 receives allocation information that standby self-tuning memory manager 134 has not allocated standby memory 132 as there are no current memory consumers on standby database system 130. In another embodiment, failover memory tuning program 136 receives allocation information that standby self-tuning memory manager 134 has allocated standby memory 132 amongst two memory consumers on standby database system 130. For example, memory is allocated equally between two memory consumers (not shown) from a primary database that has experienced failover.

In an embodiment, failover memory tuning program 136 receives an indication (step 206). In other words, failover memory tuning program 136 receives an indication that the set of "benefit-to-cost" metrics determined by a self-tuning memory manager on a primary database are available. In an embodiment, the set of "benefit-to-cost" metrics are determined on a recurring basis driven by the tuning period which is the frequency that the self-tuning memory manager runs. In an embodiment, failover memory tuning program 136 determines the set of "benefit-to-cost" metrics, of primary memory 122, as determined by primary self-tuning memory manager 124 on primary database system 120. For an illustrative example, refer to FIG. 3. Column 302 in FIG. 3 includes data specific to memory consumer 'A'. Likewise, column 304 refers to memory consumer 'B' and column 306 to memory consumer 'C'. Row 308 is the current memory allocation for each memory consumer, row 310 is the number of input/output (I/O) operations each memory consumer can execute at the current memory allocation, row 312 is the number of I/O operations saved, and new number of executable I/O operations in parentheses, associated with the theoretical addition of one block of memory to the current memory allocation for each memory consumer, and row 314 is the number of additional I/O operations needed, new number of executable I/O operations in parentheses, associated with the theoretical removal of one block of memory from the current memory allocation for each memory consumer. As shown in FIG. 3 (column 306, row 312), memory consumer 'C' benefits the most, one hundred I/O operations saved, from a one block increase in memory. Memory consumer 'C' is also negatively impacted the most, an additional one hundred I/O operations needed, with a one block decrease in memory (FIG. 3, column 306, row 314). As FIG. 3 illustrates, allocating memory from memory consumer 'A' to memory consumer 'C' has the most benefit with the least cost (i.e., negative impact).

In an embodiment, failover memory tuning program 136 receives metrics (step 208). In other words, failover memory tuning program 136 receives the set of "benefit-to-cost" metrics determined by a self-tuning memory manager on a primary database system (i.e., the set of "benefit-to-cost" metrics are sent from the primary database system to the standby database system). In an embodiment, the set of "benefit-to-cost" metrics are received every tuning period. In an embodiment, failover memory tuning program 136 receives the set of "benefit-to-cost" metrics for primary memory 122 which were determined by primary self-tuning memory manager 124. For example, the metrics shown in Table 300 in FIG. 3 are received.

In an embodiment, failover memory tuning program 136 applies metrics (step 210). In other words, failover memory tuning program 136 applies the set of "benefit-to-cost" metrics received in step 208 to the standby database system. According to an embodiment of the present invention, the memory allocation of the standby database system, as determined by using the applied set of "benefit-to-cost" metrics of the primary database system, defines the upper bound (i.e., best case) memory allocation required for the standby database system to function in the event of failover. Utilizing the primary database metrics when tuning the standby database factors in the memory resources of the standby database into the memory allocation determination. In an embodiment, failover memory tuning program 136 applies the set of "benefit-to-cost" metrics, received from primary database system 120 in step 208, to standby memory 132 on standby database system 130 during memory tuning by standby self-tuning memory manager 134. For example, the set of "benefit-to-cost" metrics from the primary database system are applied to a self-tuning memory manager on the standby database system such that the standby memory is prepared to handle the specific workload of the primary database system in the event of failover.

In an embodiment, failover memory tuning program 136 determines scaling factor (step 212). In other words, failover memory tuning program 136 determines and applies a scaling factor with which to adjust the memory allocation on the standby database system. In an embodiment, the scaling factor is an adjustment to the upper bound and lower bound memory allocations of the standby database system so that the standby database system, which may never become the primary database system, is not excessively affected by the primary database system which may negatively impact the other memory consumers on the standby database system. According to embodiments of the present invention, a small scaling factor results in a standby database tuned for optimum performance after failover while a large scaling factor results in a compromised performance of the standby database so that memory consumers already present on the standby database are not overly impacted in a negative manner. In an embodiment, the scaling factor may be determined based on one or more of the following: the number of memory consumers on the standby database system, the total amount of memory on the standby database system, or the scaling factor may be a user input which specifies the amount of time allowed for the standby database system to ramp up, from a memory utilization perspective, during failover. In an embodiment, failover memory tuning program 136 receives an input from a user of a scaling factor of one-half. For example, a database manager inputs a one-half scaling factor into a self-tuning memory manager for a standby database system.

In an embodiment, failover memory tuning program 136 determines whether failover has occurred (decision step 214). In other words, failover memory tuning program 136 determines whether a primary database system has failed and a standby database system will become primary. In an embodiment, the determination may be made by receiving a request to activate the standby database system due to a failure of the primary database system. In another embodiment, the determination may made intentionally, for example, due to preventative maintenance on the primary database system. In one embodiment, failover memory tuning program 136 determines that failover has not occurred (decision step 214, NO branch) and failover memory tuning program 136 returns to step 202 to continue to optimize the standby memory. In another embodiment, failover memory tuning program 136 determines that failover has occurred (decision step 214, YES branch) and failover memory tuning program 136 proceeds to step 216.

In an embodiment, failover memory tuning program 136 monitors ramp up (step 216). In other words, failover memory tuning program 136 has determined that failover has occurred and now monitors the ramp up of a standby database system by the self-tuning memory manager of the standby database system. In an embodiment, failover memory tuning program 136 determines failover has occurred from primary database system 120 to standby database system 130 and failover memory tuning program 136 monitors the ramp up of standby database system 130. For example, a primary database system has had a hardware failure resulting in failover to a standby database system. In an embodiment, using a scaling factor less than one (i.e., not applying the full set of "benefit-to-cost" metrics) will result in the self-tuning memory manager requiring a period of time (i.e., a ramp up) to completely adjust for optimum performance. Ramp up may be considered the time to switch between the current standby database system memory allocation and the optimized standby database memory allocation (i.e., the new primary database system memory allocation). During failover, and the resulting sudden increase of memory consumption on the standby database system, the self-tuning memory manager will dampen the memory consumption so as not to adversely affect the overall standby database system. However, given the less than one scaling factor and the dampening effect, a method for a swifter ramp up may be needed for failover. In an embodiment, some possible methods for a swifter ramp up include: eliminating the dampening, allowing the self-tuning memory manager to make larger changes in memory allocation to reach the ideal configuration quicker, and allowing the self-tuning memory manager to proceed immediately to the determined ideal memory allocation. According to an embodiment of the present invention, when failover occurs, self-tuning memory manager 134 begins a ramp up of standby memory 132 which will reach a new steady state (i.e., essentially constant over time) using the determined set of "benefit-to-cost" metrics and the determined scaling factor per failover memory tuning program 136. For example, upon failover, a self-tuning memory manager is allowed to proceed directly to the determined ideal memory allocation in order to shorten the time required for ramp up and a standby database system uses the determined set of "benefit-to-cost" metrics and the determined scaling factor to optimize a new steady state for the memory of a standby database system.

Figure 4:
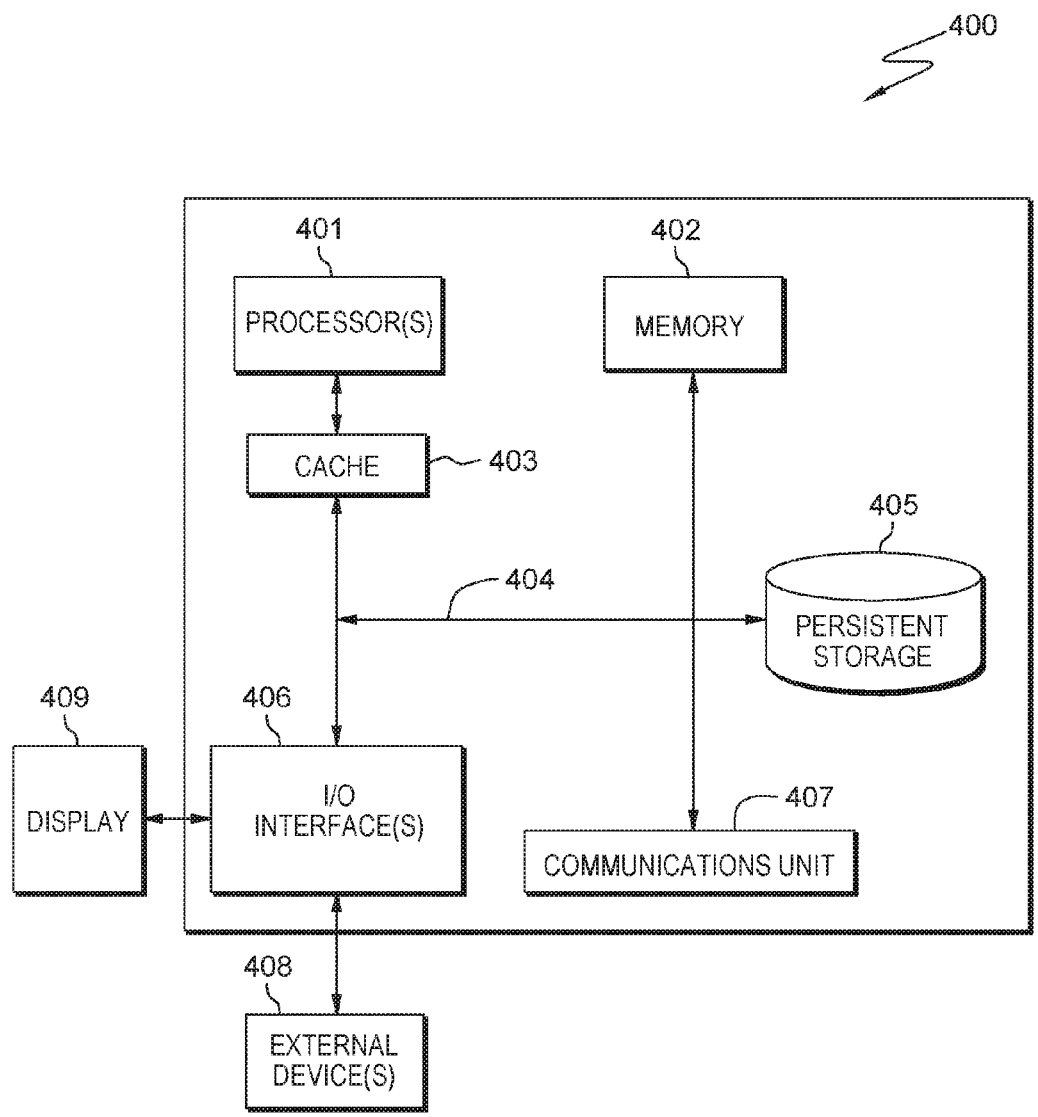
FIG. 4 depicts a block diagram of the components of the computing environment of FIG. 1, in accordance with an embodiment of the present invention.

FIG. 4 depicts computer system 400 which is an example of a system that includes failover memory tuning program 136. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product optimizing a standby database memory for post failover operation, the computer program product comprising:
    one or more computer readable storage media; and
    program instructions stored on the one or more computer readable storage media, the program instructions comprising:
        program instructions to receive a current minimum memory requirement for each memory consumer of one or more memory consumers of a primary database system;
        program instructions to receive a current memory allocation for a standby database system;
        program instructions to receive a set of benefit-to-cost metrics, wherein the set of benefit-to-cost metrics include a benefit-to-cost metric for each memory consumer of the one or more memory consumers of the primary database system and wherein the benefit-to-cost metric for each memory consumer of the one or more memory consumers is a measure of whether each memory consumer would benefit or would not benefit from additional memory;
        program instructions to apply the set of benefit-to-cost metrics to the standby database system to define an upper bound memory allocation of the standby database system to function in an event of a failover from the primary database system;
        program instructions to determine a scaling factor, wherein the scaling factor is determined using one or more of the following: a number of memory consumers on the standby database system, a total amount of memory on the standby database system, and a user input which specifies an amount of time allowed for the standby database system to ramp up, from a memory utilization perspective, during failover of the primary database system; and
        program instructions, responsive to receiving an indication of a failover of the primary database system to the standby database system, to monitor a ramp up of the standby database system, wherein the ramp up of the standby database system uses the set of benefit-to-cost metrics and the determined scaling factor.

2. The computer program product of claim 1, further comprising program instructions stored on the one or more computer readable storage media, to:
    responsive to no failover of the primary database system to the standby database system, optimize the standby database system memory for post failover operation using the set of benefit-to-cost metrics and the determined scaling factor.

3. The computer program product of claim 1, wherein the current minimum memory requirement for a primary database system is determined by a self-tuning memory manager on the primary database system and wherein the current memory allocation for a standby database system is determined by a self-tuning memory manager on the standby database system.

4. The computer program product of claim 3, wherein the self-tuning memory manager on the primary database system is a program which distributes memory resources among the one or more memory consumers on the primary database system and wherein the self-tuning memory manager on the standby database system is a program which distributes memory resources among the one or more memory consumers on the standby database system.

5. The computer program product of claim 1, wherein the program instructions to apply the set of benefit-to-cost metrics to the standby database system, comprises:
    program instructions to determine the set of benefit-to-cost metrics on the primary database system, wherein the set of benefit-to-cost metrics on the primary database system are determined by a self-tuning memory manager on the primary database system;
    program instructions to send the determined set of benefit-to-cost metrics to the standby database system; and
    program instructions to apply the determined set of benefit-to-cost metrics to a memory on the standby database system during a memory tuning process by the self-tuning memory manager on the standby database system.

6. The computer program product of claim 1, wherein the ramp up of the standby database system is a time to switch between a current standby database system memory allocation and an optimized standby database system memory allocation based on the determined set of benefit-to-cost metrics and the determined scaling factor.

7. The computer program product of claim 1, wherein the scaling factor is an adjustment to the upper bound memory allocation of the standby database system and a lower bound memory allocation of the standby database system so that the standby database system is not affected by the primary database system.

8. A computer system for optimizing a standby database memory for post failover operation, the computer system comprising:

one or more computer processors;
one or more computer readable storage media; and
program instructions stored on the one or more computer readable storage media for execution by at least one of the one or more computer processors, the program instructions comprising:
program instructions to receive a current minimum memory requirement for each memory consumer of one or more memory consumers of a primary database system;
program instructions to receive a current memory allocation for a standby database system;
program instructions to receive a set of benefit-to-cost metrics, wherein the set of benefit-to-cost metrics include a benefit-to-cost metric for each memory consumer of the one or more memory consumers of the primary database system and wherein the benefit-to-cost metric for each memory consumer of the one or more memory consumers is a measure of whether each memory consumer would benefit or would not benefit from additional memory;
program instructions to apply the set of benefit-to-cost metrics to the standby database system to define an upper bound memory allocation of the standby database system to function in an event of a failover from the primary database system;
program instructions to determine a scaling factor, wherein the scaling factor is determined using one or more of the following: a number of memory consumers on the standby database system, a total amount of memory on the standby database system, and a user input which specifies an amount of time allowed for the standby database system to ramp up, from a memory utilization perspective, during failover of the primary database system; and
program instructions, responsive to receiving an indication of a failover of the primary database system to the standby database system, to monitor a ramp up of the standby database system, wherein the ramp up of the standby database system uses the set of benefit-to-cost metrics and the determined scaling factor.

9. The computer system of claim 8, further comprising program instructions stored on the one or more computer readable storage media for execution by at least one of the one or more computer processors, to:
responsive to no failover of the primary database system to the standby database system, optimize the standby database system memory for post failover operation using the set of benefit-to-cost metrics and the determined scaling factor.

10. The computer system of claim 8, wherein the current minimum memory requirement for a primary database system is determined by a self-tuning memory manager on the primary database system and wherein the current memory allocation for a standby database system is determined by a self-tuning memory manager on the standby database system.

11. The computer system of claim 10, wherein the self-tuning memory manager on the primary database system is a program which distributes memory resources among the one or more memory consumers on the primary database system and wherein the self-tuning memory manager on the standby database system is a program which distributes memory resources among the one or more memory consumers on the standby database system.

12. The computer system of claim 8, wherein the program instructions to apply the set of benefit-to-cost metrics to the standby database system, comprises:
program instructions to determine the set of benefit-to-cost metrics on the primary database system, wherein the set of benefit-to-cost metrics on the primary database system are determined by a self-tuning memory manager on the primary database system;
program instructions to send the determined set of benefit-to-cost metrics to the standby database system; and
program instructions to apply the determined set of benefit-to-cost metrics to a memory on the standby database system during a memory tuning process by the self-tuning memory manager on the standby database system.

13. The computer system of claim 8, wherein the ramp up of the standby database system is a time to switch between a current standby database system memory allocation and an optimized standby database system memory allocation based on the determined set of benefit-to-cost metrics and the determined scaling factor.

* * * * *